United States Patent [19]

Smigo et al.

[11] Patent Number: 5,185,083
[45] Date of Patent: Feb. 9, 1993

[54] SEPARATION OF SOLIDS FROM AQUEOUS SUSPENSIONS USING MODIFIED AMINE FUNCTIONAL POLYMERS

[75] Inventors: John G. Smigo; Thomas P. McAndrew, both of Macungie; Robert K. Pinschmidt, Jr., Allentown; Andrew F. Nordquist, Whitehall, all of Pa.

[73] Assignee: Air Products and Chemicals, Inc., Allentown, Pa.

[21] Appl. No.: 803,256

[22] Filed: Dec. 5, 1991

Related U.S. Application Data

[63] Continuation-in-part of Ser. No. 252,377, May 17, 1990, Pat. No. 5,086,111.

[51] Int. Cl.$^5$ ............................................. C02F 1/56
[52] U.S. Cl. .................................... 210/735; 252/180; 525/61; 525/154; 525/328.2
[58] Field of Search .................. 210/734, 735; 525/60, 525/61, 154, 328.2; 252/180

[56] References Cited

U.S. PATENT DOCUMENTS

| | | | |
|---|---|---|---|
| 3,166,497 | 1/1965 | Matsubayashi et al. | 210/735 |
| 3,715,336 | 2/1973 | Nowak et al. | 210/735 |
| 4,217,214 | 8/1980 | Dubin | 210/735 |
| 4,421,602 | 12/1983 | Brunnmueller et al. | 162/168.2 |
| 4,444,667 | 4/1984 | Burkert et al. | 210/735 |
| 4,705,640 | 11/1987 | Whittaker | 210/733 |
| 4,808,683 | 2/1989 | Itagaki et al. | 526/307.2 |
| 4,843,118 | 6/1989 | Lai et al. | 524/555 |
| 4,952,656 | 8/1990 | Lai et al. | 525/328.2 |
| 4,957,977 | 9/1990 | Itagaki et al. | 525/328.4 |
| 5,037,927 | 8/1991 | Itagaki et al. | 526/307.7 |

FOREIGN PATENT DOCUMENTS 61-51006 3/1986 Japan .

OTHER PUBLICATIONS

M.K. Lindmann, "Vinyl Alcohol Polymers", Encyclopedia of Polymer Science and Technology, vol. 14, pp. 208-239 (1971).

*Primary Examiner*—Stanley S. Silverman
*Assistant Examiner*—Neil M. McCarthy
*Attorney, Agent, or Firm*—Mark L. Rodgers; William F. Marsh; James C. Simmons

[57] ABSTRACT

Polyvinylaminals, optionally as the formed copolymer with polyvinylhemiaminals and polyvinylacetals are useful as separating agents and are provided by reacting a poly(vinylamine) or a copolymer containing vinyl alcohol and vinylamine units with a monoaldehyde. The aldehyde, such as butyraldehyde, can be introduced into the polymer aminalization as a liquid or gas, generally in a proportion of about 0.02 to 0.5 mol per mol of alcohol and amine units in the polymer chain. These polymers, especially as the cationic salt, perform very well in the flocculation, settling, clarification and dewatering of wastewater.

14 Claims, 2 Drawing Sheets

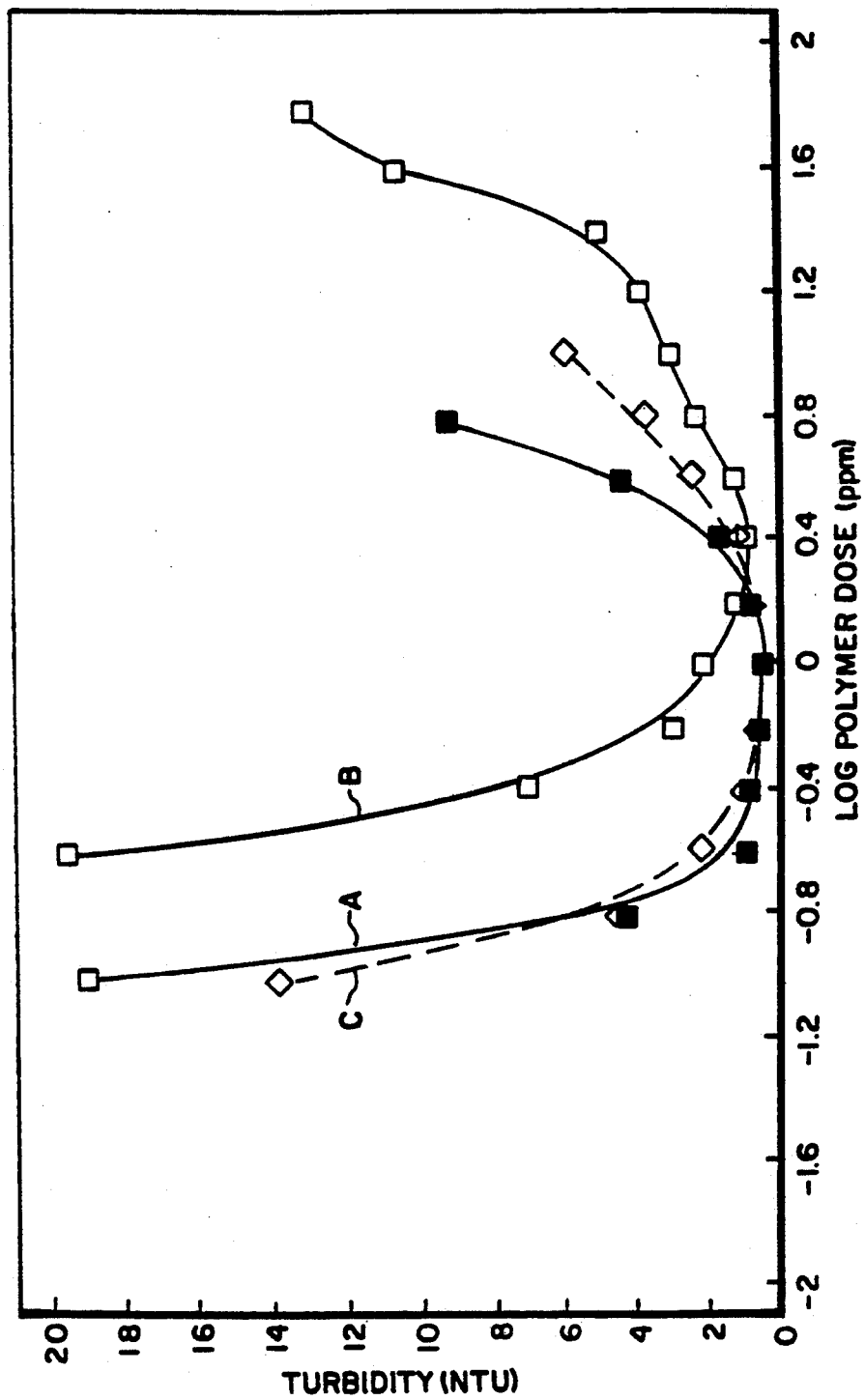

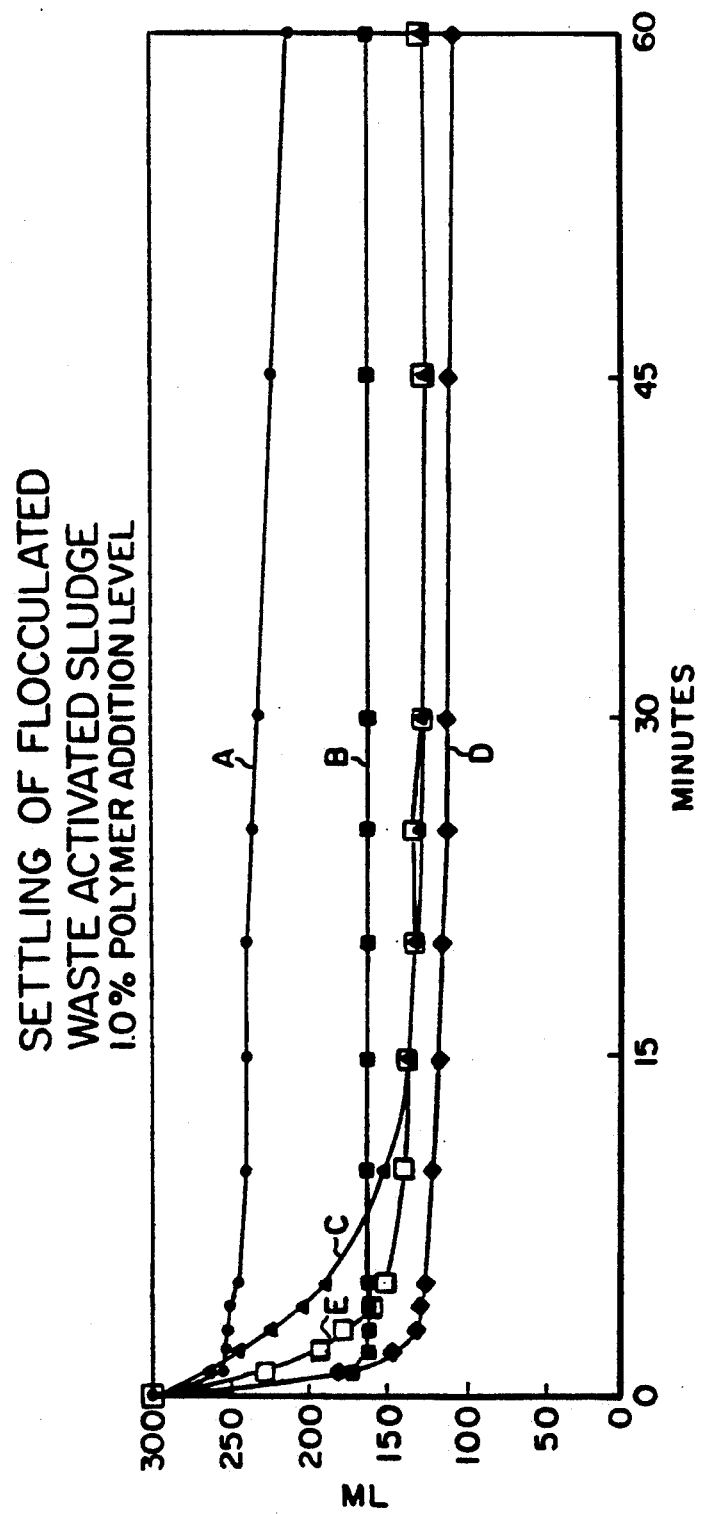

SEPARATION OF SOLIDS FROM AQUEOUS SUSPENSIONS USING MODIFIED AMINE FUNCTIONAL POLYMERS

CROSS-REFERENCE TO RELATED APPLICATIONS

This application is a continuation-in-part of copending application Ser. No. 525,377, filed May 17,1990, now U.S. Pat. No. 5,086,111.

FIELD OF INVENTION

This invention relates to suspended solids separation with a polymer containing both amine and aminal and optionally acetal functionality. Additionally, it relates to such use for polymers prepared by reacting precursor polymers containing aminal and optionally alcohol functionality with aldehydes.

BACKGROUND OF THE INVENTION

Polyvinyl acetals are commercially valuable resins used as interlayers for safety glass, in adhesives, as epoxy resin plasticizers and as wash primers. They are derived from the reaction of poly(vinyl alcohol) with aldehydes, but can be prepared by a one-step process in which a poly(vinyl ester), such as poly(vinyl acetate), is simultaneously saponified and acetalized.

The properties of polyvinyl acetals depend upon the method of preparation and the proportion of residual unhydrolyzed ester groups, the number of alcohol groups and the percentage of acetal moieties contained in the polymer. For example, in the preparation of safety glass, a polyvinyl butyral is used having a small amount of vinyl acetate, about 9% of vinyl alcohol groups, and about 70-80% of vinyl butyral groups. Polyvinyl butyral resins used in wash primers have about 2-3% of residual vinyl acetate in the polymer. Other applications, such as in specialty adhesives, textile coatings or strippable coatings require different polymer compositions.

One method of modifying the properties of polyvinyl acetals has been to change the functionality of monomers making up the polymer, such as employing a comonomer with the vinyl alcohol monomer, such as acrylonitrile, vinyl chloride, acrylate and the like. A discussion of polyvinylacetals and such modification using acetalized vinyl alcohol copolymers is given by Lindemann, *Encyclopedia of Polymer Science and Technology*, Volume 14, pages 208-239 (1971). It is desirable however to improve on the forms and functionality of polyvinylacetals in order to increase their potential utility.

Amine functional polymers are valuable as a cost effective way of incorporating cationic charge into polymers useful in cationic electrocoating, water treatment, and enhanced oil recovery (EOR). U.S. Pat. No. 4,843,118, Lai et al. (1989) discloses the use of high molecular weight ($>1\times10^6$) poly(vinylamines) in acidized fracturing fluids for EOR. Such poly(vinylamines) can be prepared by acid or base hydrolysis of poly(N-vinylformamide). Although the high molecular weight poly(vinylamines) can be used in EOR without crosslinking, the use of crosslinking agents, such as epichlorohydrin, hexamethylene diisocyanate and glyoxal, is disclosed as optional. The use of a dialdehyde, such as glyoxal, to crosslink poly(vinylamine) is also disclosed in Japanese Patent Publication No. J61051006 (1986).

In the treatment of municipal wastewater and similar wastewaters obtained from other sources than municipalities, it is an objective to achieve final disposal of the waste in a manner that is both cost effective and environmentally safe. To do this, the treatment facility must effectively separate the suspended solids material from the water to produce a high solids sludge cake which can be economically handled and a clear effluent which meets governmental standards required for return of such water to surface water, such as streams, rivers and lakes.

Inorganic salts, such as $FeCl_3$ have been used for many years to help separate the suspended solids particles from the wastewater. These salts reduced the negative charges on the particles and aided them in settling. One problem with inorganic salts is that high concentrations are needed for them to be effective, adding considerable weight to the resultant sludge cake. This additional weight substantially increases disposal costs. Also many of the inorganics leave behind unacceptable levels of heavy metals which can harm the environment. These metals and salts also interfere with attempts to incinerate the sludge cake.

At the present time, polymers, usually cationic polymers, have largely replaced the inorganic salts. These polymers are typically of a high molecular weight, on the order of 1 million or above. For example, U.S. Pat. No. 4,705,640 to Whittaker (1987) describes a number of organic polymeric flocculants having very high molecular weight which can be degraded in solution mechanically to lower molecular weight products which still have an intrinsic viscosity above 4 and a molecular weight above 1 million, typically up to 30 million.

Use of a cationic polymer negates the negative charge on suspended particles and then binds those particles together, improving separation and facilitating the dewatering step. Generally such polymers are needed at lower dosage levels than the inorganic salts, and this has the advantage of minimizing sludge weight and overall costs. Polymers are also compatible with sludge incineration. Polymers in use currently are typically cationic homopolymers or cationic copolymers with acrylamide.

U.S Pat. No. 4,217,214, Dubin (1980), discloses using a poly(vinylamine) hydrochloride having a molecular weight above $3\times10^5$ as a flocculant in treating aqueous suspensions.

U.S. Pat. No. 4,421,602, Brunnmueller, et al. (1983), discloses a partially hydrolyzed homopolymer of N-vinylformamide useful as a drainage aid in papermaking. In this polymer from 10 to 90% of the formyl groups are hydrolyzed to amine units in either acid or base.

U.S. Pat. No. 4,808,683, Itagaki, et al. (1989), discloses a vinylamine copolymer of N-vinylformamide and an alkyl or oxyalkyl N-substituted acrylamide or methacrylamide in which the formamide units have been partially hydrolyzed under acidic conditions to cationic amine units. The copolymer is said to be useful as a flocculating agent for treating wastewater, for dehydrating organic sludge and in papermaking.

U.S. Pat. No. 4,952,656, Lai, et al. (1990), discloses poly(vinylamine)s of very high molecular weight, e.g., $3.6\times10^6$ to $9\times10^6$, made by inverse emulsion polymerization, which are useful as flocculants.

U.S. Pat. No. 4,957,977, Itagaki, et al. (1990) discloses the use of vinylamine copolymers from N-vinylformamide and acrylonitrile or methacrylonitrile useful as a cationic flocculating agent for wastewater, as a dehydrating aid for organic sludges, and as a paper strength-increasing agent.

U.S. Pat. No. 5,037,927, Itagaki (1991), describes a copolymer of N-vinylformamide and an acrylate ester, such as methylmethacrylate, hydrolyzed to a poly(-vinylamine) under acidic conditions, which is said to be useful not only in papermaking, but also as a cationic polymeric flocculating agent for treating wastewater and dehydrating organic sludges.

While there are many polymeric flocculating agents available, both commercially and in the literature, for use in treating wastewater, the needs of the wastewater industry are almost as diverse as the number of facilities engaged in wastewater treating and disposal. It is highly desirable, therefore, that other methods of treating wastewater, particularly from municipalities, using polymeric flocculating agents be developed in order to minimize treating costs and enable waste systems to operate without an adverse impact upon the environment.

SUMMARY OF THE INVENTION

We have found that polyvinylaminals and polyvinylacetals containing amine functionality, prepared by reacting poly(vinylamine), e.g., a polyvinylamine homopolymer, or a copolymer of vinyl alcohol and vinylamine, with a monoaldehyde are effective separating agents, particularly in wastewater treating. The incorporation of amine functionality also improves the adhesive qualities of the polymer and increases crosslinking efficiency with epoxy and urethane polymers. The polymers can also be used in emulsifiers and as protective colloids.

According to our invention, solids are separated from an aqueous suspension with the aid of an added separating agent which is an amine functional polyvinylacetal, polyvinylhemiaminal or polyvinylaminal (hereinafter collectively "polyvinylaminal") formed as a reaction product of monoaldehyde and poly(vinylamine) or a poly(vinylalcohol)/vinylamine copolymer. The amine functional polymer containing acetal and aminal groups is provided with monomeric units randomly joined in the proportions and with the structures indicated by the formula I.

$R_2$ is H or $C_1-C_4$ alkyl or hydroxyalkyl, and
$R_3$ is H, $C_1-C_{20}$ alkyl, phenyl, or hydroxyphenyl The resultant polymer is useful in both the clarification and sludge dewatering steps of wastewater treating.

BRIEF DESCRIPTION OF THE DRAWINGS

FIG. 1 is a graph of Turbidity vs. Dose to compare the flocculation performance of a polymer of the present invention with that of prior art polymers.

FIG. 2 is a graph showing settling rates for suspended solids from wastewater using the invention and prior art polymers.

DETAILED DESCRIPTION OF THE INVENTION

Polyvinylaminals and amine functional polyvinylacetals used in our invention are prepared by condensation of poly(vinylamine), either a vinylamine) homopolymer (PVAm) or a polyvinyl alcohol/polyvinyl amine copolymer (PVOH/PVAm), with aldehydes in the presence of an acid catalyst. The compounds (generically polyvinylaminals) which are thus prepared can exist either as a salt free, amine functional form or, depending upon the pH of the solution, as a cationic ammonium polyvinylaminal. It is to be understood that the description and reference to our polyvinylaminals, unless otherwise indicated, includes both the salt free, amine functional polymer and the cationic ammonium salt. The cationic form is preferred in our process for wastewater treating.

The acetalization processes which can be used to prepare amine functional polyvinylaminals used in our invention, are similar in procedure to the processes disclosed by Lindemann (see above) for preparing polyvinylacetals from polyvinyl alcohol. These include homogeneous, heterogeneous, precipitation and dissolution methods. Among these, it is preferred to use the homogeneous method for preparing the amine functional polyvinylaminals in order to increase the degree of acetalization and obtain a more uniform distribution of the intramolecular aminal and acetal groups. The method for aminalizing PVOH/PVAm consists of the following steps:

(a) dissolving PVOH/PVAm in a water-alcohol mixture.

(b) optionally, adjusting the pH of the solution to between 1 and 4 with an acid catalyst.

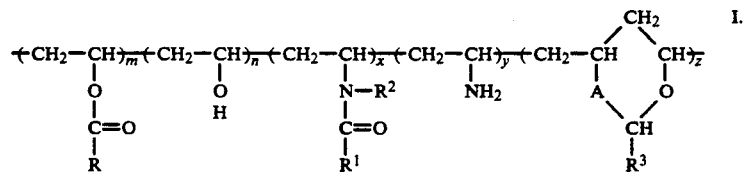

wherein
m, n, x, y and z are integers which added together equal a sum,
m is 0 to 15 percent of said sum,
n is 0 to 94 percent of said sum,
x is 0 to 30 percent of said sum,
y is 1 to 95 percent of said sum,
z is 1 to 60 percent of said sum;
A and D are each 0, NH or $NCH_3$;
R is H, $C_1-C_{11}$ alkyl, phenyl or $-CF_3$,
$R_1$ is H or methyl, (c) while mixing, adding the aldehyde to the PVOH/PVAm solution. The aldehyde is either neat or dissolved in an alcohol.

(d) heating the resulting solution to temperatures of about 30 to 80° C. for 0.5 to 5 hours.

(e) recovering amine functional polyvinylaminal by adjusting the solution pH to >10 with caustic such as NaOH or KOH, to cause precipitation of the polymer.

(f) washing the polymer with an alcohol.

PVAm is aminalized by a procedure identical to the above PVOH/PVAm aminalization except, in step (e) instead of adding caustic, the polyvinylaminal is recovered by adjusting the pH to <1 with an acid such as hydrochloric acid.

The poly(vinylamines) which are reacted with aldehydes in order to prepare the amine functional polyvinylaminals are either poly(vinylamine) homopolymers or copolymers of vinyl alcohol and vinylamine. These polymers can be represented by the following formula II which indicates the structure and proportions of the monomer units but not their order because the copolymerization is random.

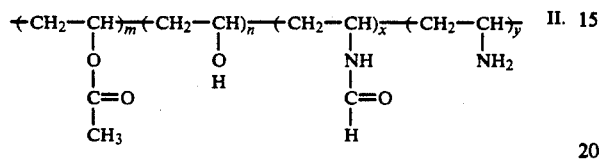

wherein m, n, x and y are integers which added together equal a sum, m is 0 to 15 percent of said sum, n is 0 to 99 percent of said sum, x is 0 to 30 percent of said sum and y is 1 to 100 percent of said sum. Such polymers can be formed by the hydrolysis of poly(N-vinylamides) or copolymers of vinyl esters, e.g. vinyl acetate, and N-vinylamides, e.g. N-vinylformamide. It is acceptable for unhydrolyzed moieties of both the ester and amide groups to remain in the polymer as indicated by the above structural formula, but preferably the amount of remaining ester groups will not exceed 2 mol % of the monomer units in the polymer and the number of unhydrolyzed amide groups will not be over 30 mol %. of the amide groups.

A preferred method for preparing high molecular weight PNVF (homopolymer) by emulsion polymerization and subsequent solution hydrolysis to PVAm is given in U.S. Pat. No. 4,798,891 (1989). For lower molecular weight PVAm preparation, solution polymerization and solution hydrolysis as described in U.S. Pat. No. 4,421,602 (1983) are the preferred methods.

A preferred method of preparing copolymers of vinyl alcohol and vinyl amine includes the following steps:
(a) continuously feeding vinyl acetate monomer and N-vinylformamide monomer into a reaction mixture in a reaction vessel,
(b) copolymerizing the vinyl acetate monomer and N-vinylformamide to yield poly(vinyl acetate)-co-poly(N-vinylformamide) [PVAc/PNVF] in the reaction mixture.
(c) continuously withdrawing from the reaction vessel reaction mixture containing the PVAc/PNVF,
(d) hydrolyzing the acetate functionality of the PVAc/PNVF in a methanolic medium to yield a vinyl alcohol copolymer as a gel swollen with methanol and methyl acetate,
(e) comminuting the gel to give a particulate copolymer product and optionally rinsing with methanol.
(f) hydrolyzing the copolymer particles as a slurry in methanol with acid or base to give PVOH/PVAm particles, and optionally but preferably,
(g) washing the particulate PVOH/PVAm with methanol to remove soluble salts and by-products and removing the solvent from the copolymer product, especially by vacuum or thermal stripping.

Although the preferred vinyl ester used in making these copolymers is vinyl acetate, other vinyl esters such as the vinyl esters of formic acid and $C_3$-$C_{12}$ alkanoic acids, benzoic acid or trifluoroacetic acid can be used. While N-vinylformamide is the preferred vinylamide monomer, other vinylamides such N-vinylacetamide or vinylamides in which the nitrogen is substituted with a methyl group or other alkyl or hydroxyalkyl groups containing 1 to 4 carbon atoms can be used. N-vinylcarbamates, particularly o-t-alkyl-N-vinylcarbamates may also be used.

The polymers used in the invention are prepared by a free radical continuous or batch polymerization process. The continuous process gives more uniform molecular weight distribution and uniformity of comonomer incorporation (i.e. a substantially random homogeneous copolymer), improves the lot-to-lot uniformity and offers the commercial advantages of continuous operation. The batch process allows production in simple batch equipment and can be carried to high conversion to avoid monomer stripping, and allows synthesis of copolymers with 1-99% NVF.

Suitable free radical initiators for the polymerization reaction include organic peroxides, such as t-butyl peroxypivalate, di(2-ethylhexyl) peroxydicarbonate, t-butyl peroxyneodecanoate and 2,2′-azobisisobutyronitrile. The concentration of the initiator in the polymerization reaction mixture normally ranges from 0.0001-2 wt %, the preferred concentration being 0.001-0.5 wt %.

Preferably the polymers are prepared using a train of continuous stirred tank reactors followed by a hydrolysis, or alcoholysis, reaction. Vinyl acetate, N-vinylformamide, free radical initiator and methanol are added continuously to the first reactor. The N-vinylformamide comonomer can be added to subsequent reactors in order to maintain a homogeneous copolymer. Also N-vinylformamide can be homopolymerized to form poly(N-vinylformamide), (PNVF), in aqueous or organic or mixed solvents.

In the copolymer process unreacted vinyl acetate is removed from the exit stream by contacting it with methanol vapors in a stripping column yielding an intermediate vinyl acetate random copolymer [PVAc/PNVF] having the formula III.

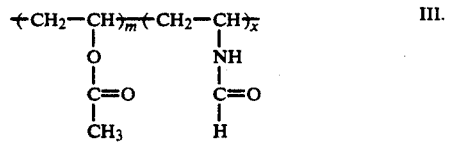

wherein
m 1-99 mole % and
x 1-50 mole %.

A suitable process for preparing the PVAc/PNVF and subsequent hydrolysis to PVOH/PNVF is essentially like the process described in U.S. Pat. No. 4,675,360 directed to vinyl alcohol/poly(alkyleneoxy) acrylate copolymers, the disclosure of which is incorporated herein by reference.

Stripping of unreacted vinyl acetate is most conveniently done for continuous processes by countercurrent contacting of the polymer paste solution with hot solvent. Stripping can be avoided by fully converting the monomers as in many batch processes. N-vinylformamide or other vinyl amides are more difficult to remove from the solution polymer, but their higher reactivity than vinyl acetate in the polymerization and frequently lower levels of incorporation minimize the amounts of these monomers present in the final product.

The polymers used in the invention can also contain other comonomers, such as for example, (meth)acrylate, crotonate, fumarate or maleate esters, vinyl chloride, ethylene. N-vinylpyrrolidone, and styrene in amounts ranging from about 2 to 20 mole %.

The hydrolysis of the PVAc/PNVF can be conducted batch or continuously with acid or base catalysis in various solvents. It is most conveniently done in methanol, optionally with various levels of water, via base catalyzed transesterification. The reaction gives methyl acetate as a volatile coproduct and PVOH copolymer as a solvent swollen but insoluble separate phase. The level of PVAc hydrolysis is adjusted by varying the base addition level and reaction time, but becomes essentially complete during base initiated PNVF hydrolysis in the subsequent step.

The transesterification solvent (for example methanol) level can be varied over wide ranges which should exceed the amount required by reaction stoichiometry and preferably provide sufficiently low viscosity for efficient mixing of added catalyst and for heat removal. Desirably, a powdery product is obtained directly in a batch hydrolysis using a vessel with efficient stirring by adding large amounts of methanol, for example a 10-fold excess over PVAc copolymer, but high levels of methanol give lower polymer throughput or require larger equipment. Continuous hydrolysis of copolymer with base can be conveniently practiced at 20-60% polymer solids by mixing the base catalyst with the alcohol solution of the copolymer and extruding the mixture onto a moving belt, much as is done commercially for the preparation of PVOH homopolymer. The hydrolyzed polymer in the form of a methanol/methyl acetate swollen gel is then ground and can be rinsed with fresh methanol to remove catalyst residues and methyl acetate. The resulting methanol swollen polymer can then be dried or, preferably, used as is in the subsequent PNVF hydrolysis step.

The PVOH/PNVF has the following formula IV.

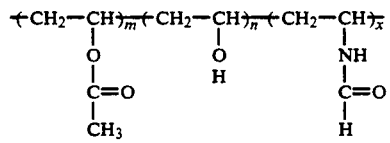

where
m is 0-15 mole %. preferably 0-2 mole % for subsequent base hydrolysis to the vinylamine copolymer,
n is 1-99 mole %. and
x is 1 to 99 mole %.

The hydrolysis of PNVF to PVAm or PVOH/PNVF to PVOH/PVAm can be accomplished by base or acid hydrolysis. Base hydrolysis, preferably with alkali hydroxide (NaOH or KOH) or alkaline earth hydroxide, requires 0.7 to 3 times, preferably 1 to 1.5 times, stoichiometric quantities based on PNVF, and is best conducted at elevated temperatures (50°-80° C.). The base or acid hydrolysis reaction can be accomplished in aqueous solution. In this case the product is recovered by precipitation or solvent evaporation. A two phase hydrolysis as a slurry of methanol swollen PVOH/PNVF particles in methanol is also possible. The two phase reaction is initially fast, but slows down after partial conversion, probably reflecting slow reaction with less accessible formamide groups. Conversion after 24 hours is about 85% but can be raised to 93% by adding small amounts of water in amounts of 1 to 20 wt %, based on methanol. The slurry can comprise 10 to 65 wt %, preferably 20 to 50 wt %, polymer particles in methanol. Contemplated as the functional equivalent of methanol as the liquid medium of the slurry are $C_2$-$C_6$ alkyl alcohols and diols and $C_4$-$C_8$ alkyl ethers. The methanol can also contain methyl acetate from the hydrolysis of any remaining PVAc component. The two phase hydrolysis has the advantage that the products can be separated from the liquid phase, rinsed, and dried to produce a salt-free primary amine functional polymer in a commercially practical process.

The poly(vinylamine) homopolymer can be prepared in like manner using N-vinylformamide as the sole monomer with subsequent hydrolysis of the amide groups to the amine functionality. As discussed in formation of the copolymer, other amides such as N-vinylacetamide, can also be used in forming the homopolymer. The homopolymer is preferred for aldehyde modification for use in wastewater treating. This PNVF can be fully or partially hydrolyzed, but preferably the hydrolysis is essentially complete, e.g., 90 to 100%. Partial hydrolysis up to this level is, however, suitable.

Synthesis of the copolymers by copolymerization of vinyl acetate and vinylformamide with subsequent hydrolysis to the polyvinyl alcohol/polyvinyl formamide and further hydrolysis to the polyvinyl alcohol/polyvinyl amine copolymer, is described in copending application Ser. No. 07/428,805, filed Oct. 30, 1989.

The amine functional polymers used in this invention have a weight average molecular weight of about 10,000 to 7 million, and preferably from 300,000 to 2 million.

In preparing the polyvinylaminals it is preferred that the concentration of copolymer or homopolymer be about 5 to 40 wt. % in a water alcohol mixture. The alcohols which are used are alcohols having 1 to 6 carbons preferably the $C_1$-$C_4$ alcohols and the concentration of alcohol can vary from 0 to 70 wt. % of the water alcohol mixture, but is preferably from 0 to 5 wt %.

Suitable aldehydes for preparing the amine functional polyvinylaminals are monoaldehydes which include aliphatic aldehydes such as formaldehyde, acetaldehyde, butyraldehyde, hexylaldehyde. 2-ethyl hexaldehyde, octylaldehyde and the like, aromatic aldehydes such as benzaldehyde, and substituted aromatic aldehydes such as the hydroxy-substituted aromatic aldehyde. salicylaldehyde. Aldehydes having 2 to 8, preferably 2 to 6, carbon atoms per molecule have been found most useful in preparing the polymeric flocculant. Butyraldehyde and hexylaldehyde are preferred for making the wastewater separating agent.

The concentration of the aldehydes in the aminalization mixture is about 0.02 to 0.5, preferably 0.05 to 0.4, mol of aldehyde per mol of vinylalcohol and vinylamine units in the polymer chain. The aldehyde can be introduced either as a liquid or as a gas.

Suitable acid catalysts for preparing the aminals are the mineral acids such as hydrochloric acid, sulfuric acid, or perchloric acids and organic acids such as acetic, trifluoroacetic, aryl sulfonic and methane sulfonic acids. The concentration of the acid catalyst is from about 0.001 to stoichiometric, preferably stoichiometric based on the amine content the polymer being aminalized.

Reaction temperatures for the aminalization can range from about 20 to 120° C., but preferably the temperature is about 30 to 80° C. Reaction times can run from 0.5 to 10 hours or more, but preferably the reaction will be complete in 0.5 to 5 hours.

In the homogeneous method which is preferred, the reaction is carried o out in aqueous solution of the polymer. A heterogeneous method can be used, however, in which the polymer is present either as a powder or a film. The reaction can also be carried out in a homogeneous phase initially, but with the polymer precipitating at about 30% acetalization and at that point the reaction is continued using the heterogeneous system. Another procedure is referred to as the dissolution method in which the reaction is initially in a heterogeneous system with the polymer powder suspended in a solvent which then dissolves the aldehyde and the final product.

In the formula I given above for the structure of the polymer, the aminalized portion of the polymer is formed from two of the monomer units derived from either the alcohol or the amine units. The reaction with the aldehyde occurs with the polymer on adjacent monomer units involving either hydroxy or amine functionality. The most common form of the aminalized unit will be where in the formula I the atoms represented by A and D are both either oxygen or NH, but it should be understood that units can also be present in which either A or D is oxygen and the other A or D in the unit is NH.

In wastewater treating, we prefer the aminalized portion of the polymer which includes the reacted monoaldehyde to make up about 10 to 25 mol percent of the polymer used as a separating agent. The molecular weight of this polymer is preferably at least $3 \times 10^5$ and more preferably $6 \times 10^5$, up to $1.3 \times 10^6$, as determined by gel permeation chromatography (GPC). Although the neutralized form of the polymer can be used, especially at the higher molecular weights, it is preferred to use the cationic form of the amine functionality, for example, the amine.HCl salt. Such a poly(vinylamine.HCl) modified with about 17 mol percent butyraldehyde and having a weight average molecular weight of about $10^6$ has demonstrated superior results in wastewater clarification and sludge dewatering.

The amount of polymer added to the wastewater or the sludge depends upon the particular nature of the sewage and its source. The possible levels span a broad range from 0.01 to 5 percent based upon the weight of dry suspended solids, but flocculation tests well known in the industry can identify a practicable range for a given situation. In other words, optimum polymer levels can be expected to vary from one treatment and disposal plant to another and will vary within the same plant from time to time. It has been found that the polymer of this invention performs well at conventional levels for added separating agents which in municipal plants is about 6 to 20 pounds of separating agent per ton of dry solids. Our preferred addition level is about 0.5 to 4% of polymer based on the weight of dry solids suspended in the wastewater. At the lower levels, the superior performance of these polymers in clarification is apparent while dewatering advantages are also realized at the 1% level and above.

Municipal wastewater treatment normally includes clarification of water to be dispersed or returned to streams from a clarifier or settling basin. Often, additional steps to dewater settled organic sludge are included, using centrifuges, presses, filters, and the like to simplify sludge handling and disposal. According to our invention, the polymer is added to or upstream of the clarification step to reduce turbidity in water. This is o very important where treated waste water is returned to surface streams and lakes. The polymer thus added will thereafter be present in the settled sludge to assist in any dewatering. Alternatively, the polymer can be added only to the sludge before dewatering or it can be used at a low level in clarification and additional polymer used for sludge dewatering. This use of the amine functional polyvinylaminal can provide significant savings in sludge disposal costs and enable municipalities to meet strict government standards on water returned to rivers and lakes. In addition, the use of these polymers is advantageous because of their good stability and long shelf life.

In order to describe our invention further, the following examples are presented which should be construed as illustrative only and not to limit unduly the scope of the invention.

EXAMPLE 1

This example demonstrates a polymerization process for making the copolymer PVAc/PNVF. A continuous polymer paste process was followed for making PVAc/PNVF using two 2,000 ml jacketed reaction vessels and a surge vessel with bottom outlets and a methanol stripper column. Each reaction vessel was equipped with a stirrer, feed lines, thermocouple, nitrogen sparge line and reflux condenser. The reaction vessels were connected in series by a gear pump with variable speed motor. The methanol stripper was a 70 cm×75 mm column, containing 8×8 mm Raschig rings in the top two thirds and 6×6 mm Raschig rings in the bottom third. At the top of the column was a take-off condenser and a methanol boiler was connected to the bottom of the column.

Table 1 shows the initial charges that were added to reactors I and II for preparation of a copolymer containing 6 mol percent PNVF (PVAc/6% PNVF). Continuous feeds 1, 2 and 3 were added to reactor I and feed 4 to reactor II at the hourly feed rates shown in Table 1. When the reactor temperatures approached 60° C., the feeds were begun. The flow rates from reactor I to reactor II and from reactor II to the paste collecting port were adjusted to maintain reactor I and reactor II levels. Free monomer (vinyl acetate and N-vinylformamide) in reactors I and II was monitored periodically by a titration method. Percent unreacted N-vinyl formamide was determined by gas chromatography. The amount of catalyst added into reactor I was varied to adjust percent vinyl acetate at steady state.

Once initial equilibrium was achieved, polymer paste was collected. To maximize paste yield at the end of a sequence, reactor I was cooled to ambient and its feeds were discontinued but the feeds (including from reactor 1) to reactor II were maintained. When reactor I was empty, the feed to reactor II was discontinued and the contents of reactor II were cooled and commingled with prime material.

Paste was poured or pumped continuously into the surge vessel and pumped to the top of the heated methanol stripper for removal of vinyl acetate. The paste was restripped as necessary to achieve a vinyl acetate level below 0.1%.

TABLE 1

| Initial Charges (g) | Reactor I | Reactor II |
| --- | --- | --- |
| N-vinylformamide (75% Basis) | 21.3 | 7 |
| Vinyl acetate (distilled) | 460 | 248 |
| Methanol | 1,001 | 1,048 |
| Lupersol 10* | 0.12 | 0.12 |
| Tartaric Acid | 0.02 | 0.02 |
| Feeds | g/h | mL/h |
| 1. Vinyl acetate (dist.) | 370 | 440 |
|    N-Vinylformamide (Dist., 75%) | 21.3 | |
| 2. Methanol | 150 | 190 |
|    Lupersol 10 | 0.43 | |
| 3. Methanol | 107 | 135.5 |
|    Tartaric acid | 0.012 | |
| 4. Vinyl acetate (Dist.) | 12 | 12.35 |

*Lupersol 10 is t-butylperoxyneodecanoate available commercially from Penwalt Corp.

Rector temperatures were 60°–63° C. throughout the polymerization. A higher molecular weight PVAc/6% PNVF paste was collected after initial equilibration when the concentration of vinyl acetate was 30–43% in reactor I and 22–35% in reactor II by titration.

"Prime" PVAc/6% PNVF paste was collected as the free monomer concentration approached 20% in reactor II. Using a catalyst concentration of 0.67% in Feed 2, free monomer was 28 to 30% in reactor I and 16 to 19% in reactor II. Percent unreacted NVF was about 0.76% in reactor I and 0.22% in reactor II. Analysis of the polymer by NMR showed a PNVF:PVAc ratio of 1/16.1, i.e. 6.2% NVF.

EXAMPLE 11

This example demonstrates the hydrolysis of PVAc/PNVF to PVOH/PNVF and the subsequent hydrolysis to PVOH/PVAm.

In general, PVAc/PNVF paste was added to a flexible plastic bag. KOH (0.01 eq. on VAc) dissolved in methanol was added to the bag with thorough mixing. The bag was sealed and heated at 60° C. in a water bath for 15 minutes, precipitating the polymer as a white rubbery slab.

The PVOH/PNVF "slab" was mechanically ground into small pieces, the ground polymer was added to a round-bottom flask equipped with mechanical stirrer, temperature controlled heating mantle, nitrogen blanket, thermometer, and condenser. Methanol was added to the flask to give about 15% polymer slurry by weight. (An attempt to hydrolyze PVOH/PNVF in methanol containing 10% deionized water resulted in slightly higher percent hydrolysis.) KOH (1.2 eq. on NVF) dissolved in methanol was added to the slurry. The slurry was stirred vigorously and heated to reflux (63° C.) for 12 hours after which the slurry was cooled to ambient, filtered, washed with methanol and dried at 60° C. under house vacuum.

Hydrolysis of PVAc/6% PNVF to PVOH/6% PNVF. KOH (0.0045 g; 0.0001 mol; 0.04 mol % on VAc) was dissolved in 5 mL of methanol and added to PVAc/6% PNVF paste (50 g paste. 18.5 g of solid., 0.23 mol) with thorough mixing. The solution was poured into a plastic bag. The bag was sealed and heated at 50° C. in a water bath for 2.0 hours with no change in appearance. KOH (0.11 g; 0.002 mol; 1.0 mol % on VAc) was dissolved in 5 mL of methanol and added to the bag with thorough mixing. The bag was re-sealed and placed in the water bath at 50° C. immediately precipitating the polymer as a white rubbery slab. After 15 min., heating was discontinued and the slab was removed from the bag, mechanically ground, washed with methanol, decanted, then stored under fresh MeOH. Molecular weight measurements gave $\overline{M}n = 23,000$, $\overline{M}w = 44,000$ for PVOH/6% PNVF.

Slurry Hydrolysis of PVOH/6% PNVF to PVOH/6% PVAm. To a 100 mL round-bottom flask equipped with mechanical stirrer, heating mantle, $N_2$ blanket, thermometer and thermowatch were added the PVOH/PNVF polymer and 75 mL of methanol. KOH (1.05 g; 0.0187 mol; 1.36 eq. on original NVF) was dissolved in 5 mL of methanol and added to the slurry. The slurry was heated with vigorous stirring at reflux (63° C.) for 3.25 hours. Base consumption was monitored by potentiometric titration of 5 mL aliquots (MeOH-based solution) with approximately 0.1 M HCl to pH = 7. After heating for 3.25 hours, the slurry volume was low due to evaporation of methanol and removal of aliquots for titration. Heating was discontinued and the slurry was cooled overnight.

The following day, 50 mL of methanol was added. The slurry was reheated with vigorous stirring at reflux for 5 hours. Base consumption was monitored as above. The slurry was then cooled, filtered, washed with methanol and dried at 60° C. under house vacuum to give 6.6 g of oven dried material. This product showed complete PVAc hydrolysis and 77% PNVF hydrolysis.

EXAMPLE III

This example demonstrates acetalization of PVOH/6% PVAm. To a 250 ml 3-neck round bottomed flask equipped with condenser, $N_2$-inlet, thermometer, thermowatch, mechanical stirrer, and heating mantle were added butyraldehyde (4.53 g), methanol (10 g), and sulfuric acid (0.5 g). While stirring, a PVOH/6%PVAm solution (10 g in 80 g of $H_2O$) was added dropwise into the methanol solution. The resulting solution was heated to 65° C. for 1.5 hours. At end of the reaction, the aqueous polymer solution was cooled. The polymer products were precipitated by adjusting the solution pH to 10.5 with NaOH, and then were filtered, washed sparingly with H20, and dried under vacuum (yield: 12.2 g).

Product analysis was as follows:

$^1$H NMR (CD OD): δ0.95 (t, $CH_3$, 0.84H), 1.57 (m, CH, 3.1 H), 3.90 and 4.05 (2 br. s, CHO, ~0.83H), 4.6 (br. s, $CHO_2$, 0.2H), and 4.85 ppm (s, active H). This is consistent with formation of slightly less than the theoretical amount of acetal and aminal.

EXAMPLE IV

This example demonstrates aminalization of poly(vinylamine). Poly(vinylamine) was made by homopolymerization of N-vinylformamide followed by hydrolysis to the amine. The aminal was prepared by reaction with butyraldehyde. To a 250 ml 3-neck round bottomed flask equipped with condenser, $N_2$-inlet, thermometer, thermowatch, mechanical stirrer, and heating mantle were added butyraldehyde (4.53 g), methanol (10 g), and sulfuric acid (0.5 g). While stirring, a PVAm solution (10 g in 80 g $H_2O$) was added dropwise into the methanol solution. The resulting solution was heated to 65° C. for 1.5 hrs. At the end of the reaction, the aqueous polymer solution was cooled. The polymer products were precipitated by adjusting the solution pH to 10.5 with NaOH, and then were filtered, washed sparingly with $H_2O$, and dried under vacuum (yield: 8.6 g).

The NMR was poorly resolved: $^1$H NMR (CD$_3$OD): δ0.95 (t, CH$_3$, 0.84H), 1.6-2.5 (m, CH ), 3.55 (m, CH), 3.95 (m, CH), 4.25 (m, CHN$_2$), 4.9 (active H). Integral ratios were consistent with high aminal formation efficiency.

EXAMPLE V

This example illustrates a preferred method for aminalization of poly(vinylamine). The polyvinylamine was prepared by homopolymerization of N-vinylformamide followed by hydrolysis of the amine as cited in the teachings. A round bottom flask equipped with an overhead stirred, and a water cooled condenser was charged with 100 g of a 10 wt % solution of polyvinylamine hydrochloride in deionized water. 4.53 g (0.0629 moles) of butyraldehyde in 5 mL of methanol was added. The reaction was ramped to 65° C. and held at 65° C. for 2 hours. After cooling to 25° C., the reaction mix was slowly added to 400 mL of isopropanol to precipitate the polymer. The tacky plastic precipitate was transferred to fresh isopropanol and soaked for 16h to remove water. The polymer, now toughened, was broken into approximately 0.5 cm pieces, air dried, ground in a Wiley mill to <40 mesh, Soxhlet extracted with isopropanol for 16h and dried at 45°-65° C. and 250 torr. Yield: 9.40 g of 20.9 mer % butyraldehyde based on 13C NMR. Ash: not detectable, 2.44% moisture, residual isopropanol: 9.0%.

EXAMPLE VI

This example illustrates the aminalization of PVOH/12% PVAm under acidic conditions. A round bottom flask equipped with an overhead stirred, and a water cooled condenser was charged with 100 g of a 10 wt % solution of coPVOH/12% PVAm (0.221 moles of alcohol plus amine). The solution was adjusted to pH 1 with concentrated hydrochloric acid. 0.7961 g (0.0111 moles) of butyraldehyde dissolved in 5 mL of methanol was added. The reaction was ramped to 65° C. over 5 minutes and held at 65° C. for 2h. After cooling to 25° C., the reaction mix was slowly added to 300 mL of isopropanol. The precipitated. polymer was washed in isopropanol, air dried, pulverized to <40 mesh, washed with isopropanol, and dried at 60° C. and 250 torr. Yield: 9.95 g of coPVOH/11.7% PVAm, with 4 mole % butyraldehyde incorporated based on $^{13}$CNMR:8% of the oxygen was reacted to the acetal (—O—CH(C$_3$H$_7$)—O—) structure. No aminal (—NH—CH(C$_3$H$_7$)—NH—), was detected.

EXAMPLE VII

This example illustrates the aminalization of PVOH/12% PVAm under basic conditions. The reaction was performed as in Example VI above, except the 10 wt % solution of coPVOH/12% PVAm solution was not pH adjusted, giving a solution of pH 10. After reaction for 5h and cooling to 25° C., the polymer was isolated by precitation, isopropanol washing, grinding, isopropanol washing again, and drying. Yield: 9.12 g of copolymer with 5 mole % butyraldehyde incorporation: 33% of the nitrogen is in an aminal (—NH—CH(C$_3$H$_7$)—NH—), and 25% of the nitrogen is in a hemiaminal (—NH—CH(C$_3$H$_7$)—O—) structure. No acetal was detected.

EXAMPLE VIII

This example demonstrates the exceptional performance of the polymers of the present invention as flocculants. To be effective as flocculants most prior art polymers must have high molecular weight, which causes difficulties in synthesis and application and also increases cost. The polymers of the present invention perform well even at low molecular weight, an unexpected and industrially valuable property.

The effect of poly(vinylamine)/poly(vinylbutylaminal) (30,000–40,000 MW) (curve A) according to the invention in flocculation of a standard suspension of bentonite clay was tested and compared to other polymers, namely polyacrylamide (6 million MW from Scientific Polymer Products) (curve B) and poly(N-vinylformamide) (2.4 million MW) (curve C).

To 200 ml of a well-hydrated, 200 ppm stock suspension of bentonite in tap water, was added 50 ml of polymer solution (tap water). The concentration of added polymer solution was adjusted so that the polymer concentrations (dosages) in the complete system ranged from 0.01 to 100 ppm. This system was stirred for 13 minutes, followed by 10 minutes of settling. The turbidity of the supernatant was then measured (good flocculation gave a clear supernatant). The results are reported in the graph of FIG. 1.

From this data, a curve of turbidity (i.e., flocculating ability) vs. dosage was constructed. Polymer performance was evaluated on the basis of:
 a. dosage at curve minimum;
 b. turbidity at curve minimum;
 c. curve width (good flocculation over a broad range is desirable).

From the results shown in FIG. 1, it can be seen that the polymer of the present invention, even at low molecular weight, is a significantly better flocculant than the high molecular weight polyacrylamide, and as good as or better than the high molecular weight poly(N-vinylformamide).

EXAMPLES IX-XI

Runs in Examples IX-XI were conducted using both raw sewage influent (ca. 200 ppm dry suspended solids) and waste activated sludge (1.0-3.0% dry suspended solids) from the Allentown, PA wastewater treatment facility. Polymer addition levels were 0.5% for Example IX, 1.0% for Example X, and 4.0% for Example XI dry polymer based on dry suspended solids. The performance of a poly(vinylamine).HCl homopolymer modified as described with about 17 mol % butyraldehyde and having a molecular weight of about $10^6$ (C$_4$ MOD PVAm . HCl) was compared with that of two well-known commercial products, Betz 1158 and Allied Colloids Percol 757, along with poly(vinylamine hydrochloride) homopolymers (PVAm . HCl) at two molecular weight levels, ($4 \times 10^5$ and $8 \times 10^5$). Betz 1158 and Allied Colloids Percol 757 are high molecular weight cationic polymers, sold commercially for use in wastewater treatment.

Settling: For the settling tests, 200 ml of waste activated sludge (ca. 1-3% suspended solids) was measured into a beaker. To this was added 50 ml of a polymer solution at the desired dosage and stirred accordingly:
 1. 3 minutes at 100 rpm
 2. 5 minutes at 50 rpm
 3. 5 minutes at 33 rpm.

The stirred suspension was then poured into a graduated cylinder and the height of the settling flocs was measured at the following time intervals.,
 (1,2.3,4,5,10,15,20,25,30,45 minutes, 1 and 24 hours). Also after 24 hours, an aliquot of the supernatant was drawn off and measured for turbidity using an industry standard meter. Results are shown in Table 2.

TABLE 2

| | SETTLING DATA | | |
|---|---|---|---|
| | 1 HR VOLUME | 24 HR VOLUME | 24 HR TURBIDITY |
| EXAMPLE IX: 0.5% POLYMER ADDITION LEVEL | | | |
| PERCOL 757 | 105 | 95 | 155 |
| BETZ 1158 | 100 | 90 | 338 |
| PVAm.HCl ($4 \times 10^5$) | 125 | 90 | 183 |
| PVAm.HCl ($8 \times 10^5$) | 85 | 75 | 185 |
| C4 MOD PVAm.HCl | 135 | 100 | 75 |
| EXAMPLE X: 1.0% POLYMER ADDITION LEVEL | | | |
| PERCOL 757 | 160 | 105 | 9 |
| BETZ 1158 | 210 | 200 | 22 |
| PVAm.HCl ($4 \times 10^5$) | 125 | 120 | 116 |
| PVAm.HCl ($8 \times 10^5$) | 105 | 105 | 85 |
| C4 MOD PVAm.HCl | 125 | 120 | 38 |
| EXAMPLE XI: 4.0% POLYMER ADDITION LEVEL | | | |
| PERCOL 757 | 90 | 70 | 55 |
| BETZ 1158 | 96 | 88 | 36 |
| PVAm.HCl ($4 \times 10^5$) | 102 | 92 | 18 |
| C4 MOD PVAm.HCl | 138 | 140 | 4 |

As shown in Table 2, at a polymer addition level of 0.5%, Example IX, the $C_4$ modified poly(vinylamine hydrochloride) polymer displayed settling rates slower than any of the tested polymers, but at 24 hours there was little performance differences between any of the polymers as they all settled the waste activated sludge effectively. However, the resultant supernatant clarity with the $C_4$ modified polymer was superior to any other tested.

At a polymer addition level of 1.0%, Example X, the $C_4$ modified poly(vinylamine hydrochloride) polymer displayed settling performance superior to the Betz 1158 and competitive to the other polymers. The short term (less than 1 hour) settling rates are shown in FIG. 2. In FIG. 2, which plots volume of settled sludge in mls as a function of time in minutes, plot A is for Betz 1158, plot B is Percol 757, plot C is PVAm . HCl ($4 \times 10^5$), plot D is PVAm . HCl ($8 \times 10^5$), and plot E is the butyraldehyde modified PVAm . HCl. The clarity of the resultant supernatant was very good although slightly poorer than that of the two commercial products.

At a polymer addition level of 4.0%. Example XI, settling rates for the Percol 757, Betz 1158 and poly(vinylamine hydrochloride) ($4 \times 10^5$) were very close. The rate of the $C_4$ modified poly(vinylamine hydrochloride) was slightly slower. After 24 hours, its level of settling was still slightly behind the other polymers, however the clarity of the supernatant was far superior to the other three polymers tested.

Many water treating facilities have ample settling basins for prolonged residence times of 24 hours or more, but find it difficult to meet environmental standards on suspended solids in discharged effluents. The settling data of Table 2 for Examples IX, X and XI show that our invention provides a very useful method of obtaining low turbidity in clarified waste water.

Dewatering: The dewatering runs consisted of measuring 50 ml of the same waste activated sludge as used in the settling runs into a beaker. To this was added 25 ml of a polymer solution of desired dosage. The suspension was then stirred:
1. 2 minutes at 100 rpm
2. 3 minutes at 33 rpm A pre-weighed piece of No. 41 Whatman filter paper was placed in a Buchner filtration funnel. After stirring, the suspension was immediately transferred to the Buchner vacuum filtration apparatus which already had the vacuum turned on. A stopwatch was activated as soon as the suspension was delivered to the Buchner funnel. The amount of time for all the water to filter through was measured. The pre-weighed piece of filter paper with wet filter cake was weighed wet and then placed in a vacuum oven at 100° C. until dry, (ca. 20 minutes). After drying, the filter paper with filter cake was reweighed and a solids was calculated. A turbidity measurement was then taken on the filtrate that passed through the filter paper. The results are shown in Table 3.

TABLE 3

| | DEWATERING DATA | | |
|---|---|---|---|
| | RATE (secs) | % SOLIDS | TURBIDITY |
| EXAMPLE IX: 0.5% POLYMER ADDITION LEVEL | | | |
| PERCOL 757 | 24 | 19.9 | 120 |
| BETZ 1158 | 22 | 19.8 | 252 |
| PVAm.HCl ($4 \times 10^5$) | 62 | 17.5 | 177 |
| PVAm.HCl ($8 \times 10^5$) | 27 | 17.9 | 131 |
| C4 MOD PVAm.HCl | 101 | 16.4 | 75 |
| EXAMPLE X: 1.0% POLYMER ADDITION LEVEL | | | |
| PERCOL 757 | 9 | 14.2 | 7 |
| BETZ 1158 | 12 | 17.1 | 5 |
| PVAm.HCl ($4 \times 10^5$) | 9 | 23.6 | 114 |
| PVAm.HCl ($8 \times 10^5$) | 6 | 20.7 | 77 |
| C4 MOD PVAm.HCl | 9 | 22.7 | 36 |
| EXAMPLE XI: 4.0% POLYMER ADDITION LEVEL | | | |
| PERCOL 757 | 31 | 21.4 | |
| BETZ 1158 | 227 | 6.2 | |
| PVAm.HCl ($4 \times 10^5$) | 3 | 19.0 | |
| C4 MOD PVAm.HCl | 33 | 21.0 | |

As shown in Table 3, at a polymer addition level of 0.5%, Example IX, the $C_4$ modified poly(vinylamine hydrochloride) polymer displayed water clarity better than the commercial products even though it produced a final sludge cake in which the % solids were somewhat poorer than for the commercial products and the dewatering rate was significantly slower than for the other polymers.

At a polymer addition level of 1.0%, Example X, the $C_4$ modified poly(vinylamine hydrochloride) polymer displayed equivalent dewatering rates and better final sludge cake % solids than the commercial products tested. However, the water clarity of the filtrate, although very good, was not equal to the commercial products.

At a polymer addition level of 4.0%, Example XI, the sludge dewatering performance of the $C_4$ modified poly(vinylamine hydrochloride) polymer was superior to the Betz 1158, displaying much faster dewatering rates and higher final sludge cake % solids. It was equal to the Percol 757 in all dewatering performance parameters. No turbidity measurements were taken for the dewatering runs at this polymer addition level.

At polymer levels of 1.0% and 4.0%, based on dry solids in the settled sludge, the dewatering according to our invention provides very high (21 to 23%) solids in the filter cake. This enables a significant cost savings in the disposal of dewatered sludge. Although the unmodified poly(vinylamines) also produced high percent solids in the filter cake, the invention shows a substantial improvement over these polymers in the turbidity of the filtrate.

An advantage for our invention over previous flocculating methods is that it demonstrates a unique combination of:

a. overall excellent flocculation, settling and dewatering performance at low molecular weights for the added polymer;
b. an effluent of excellent clarity, lower than that seen with other commercial polymers tested, (at dosages of 0.5% and 4.0%)., and
c. superior dewatered sludge solids content at dosages of 1.0% and 4.0%.

These benefits are accomplished using a polymer of relatively low molecular weight compared to the flocculating polymeric additives in commercial use which generally have molecular weights on the order of $6 \times 10^6$ or more. The lower molecular weight polymer is less likely to break down into shorter chain lengths and consequently change properties.

Other aspects and embodiments of our invention will be apparent to those skilled in the art from the above disclosure without departing from the spirit or scope of our invention.

We claim:

1. In a process for separating solids from an aqueous suspension, the improvement comprising adding to said suspension as a separating agent an amine functional polyvinylaminal which is the reaction product of monoaldehyde and poly(vinylamine).

2. The process of claim 1 wherein said poly(vinylamine) is a copolymer of vinyl alcohol and vinylamine.

3. The process of claim 1 wherein said poly(vinylamine) is a homopolymer.

4. The process of claim 1 wherein said aldehyde is butyraldehyde or 2-ethylhexaldehyde.

5. In a process for separating solids from an aqueous suspension, the improvement comprising adding to said suspension an effective amount of an amine functional polymer containing aminal, hemiaminal and acetal groups having monomeric units randomly joined in the proportions and structures indicated by the formula:

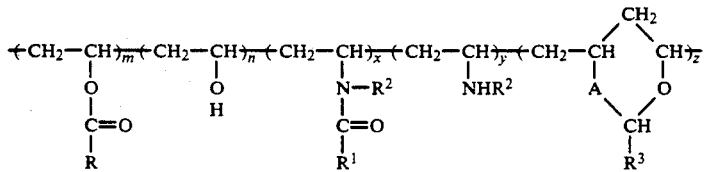

wherein m, n, x, y and z are integers which added together equal a sum,
m is 0 to 15 percent of said sum,
n is 0 to 94 percent of said sum,
x is 0 to 30 percent of said sum,
y is 1 to 95 percent of said sum,
z is 1 to 60 percent of said sum;
A and D are each 0 or $NR^2$
R is H, $C_1$-$C_{11}$ alkyl, phenyl or $-CF_3$,
$R^1$ is H or methyl,
$R^2$ is H or $C_1$-$C_4$ alkyl or hydroxyalkyl and
$R^3$ is H, $C_1$-$C_{20}$ alkyl, phenyl, or hydroxyphenyl.

6. The process of claim 5 wherein m and n are zero, A and D are NH, $R^1$ is H, $R^2$ is H and $R^3$ is alkyl.

7. The process of claim 6 wherein said polymer is in the form of a cationic ammonium polyvinylaminal.

8. The process of claim 1 wherein said aqueous solids suspension is municipal wastewater.

9. The process of claim 5 wherein said aqueous solids suspension is municipal wastewater.

10. A method of treating wastewater which comprises adding to at least one stage of the treating process an amine functional polyvinylaminal which is the reaction product of monoaldehyde and poly(vinylamine).

11. The method of claim 10 wherein said polyvinylaminal is added in an effective amount to the wastewater prior to clarification.

12. The method of claim 10 wherein said polyvinylaminal is added in an effective amount to separated sludge prior to dewatering.

13. The method of claim 10 wherein said polyvinylaminal is added at a level of about 0.5 to 4 percent based on the dry solids content of said wastewater.

14. The method of claim 10 wherein said monoaldehyde is butyraldehyde and said polyvinylaminal is in the form of an amine hydrochloride.

* * * * *